United States Patent [19]
DasGupta et al.

[11] Patent Number: 5,137,954
[45] Date of Patent: Aug. 11, 1992

[54] POLYVINYL BUTYRAL SHEET

[75] Inventors: Arijit M. DasGupta, Belchertown; Donald J. David, Amherst; Roland J. Tetreault, Springfield, all of Mass.

[73] Assignee: Monsanto Company, St. Louis, Mo.

[21] Appl. No.: 767,760

[22] Filed: Sep. 30, 1991

[51] Int. Cl.$^5$ .............................................. C08K 5/09
[52] U.S. Cl. ................................... 524/284; 524/297; 524/557; 428/98; 525/60; 525/61
[58] Field of Search ............... 525/61, 60; 524/284, 524/297, 557

[56] References Cited

U.S. PATENT DOCUMENTS

| | | | |
|---|---|---|---|
| 2,194,613 | 3/1940 | Perkins | 525/61 |
| 2,232,806 | 2/1941 | Ryan | 428/437 |
| 2,316,921 | 4/1943 | Weihe et al. | 525/61 |
| 2,356,480 | 8/1944 | Swan | 525/61 |
| 3,934,587 | 1/1976 | Gordon | 525/61 X |
| 4,499,236 | 2/1985 | Hermann et al. | 525/58 |
| 4,743,409 | 5/1988 | Nomura et al. | 264/1.3 |
| 5,019,624 | 5/1991 | Gutweiler et al. | 525/61 |

FOREIGN PATENT DOCUMENTS

| | | | |
|---|---|---|---|
| 0591549 | 1/1960 | Canada | 525/61 |
| 0602016 | 7/1960 | Canada | 525/61 |
| 394884 | 10/1990 | European Pat. Off. | |
| 1225268 | 10/1986 | Japan | 525/61 |
| 278148 | 12/1987 | Japan | |

OTHER PUBLICATIONS

Journal of Polymer Science, vol. VIII, No. 2, pp. 225-241, "Relation of Composition of Polyvinyl Acetals to Their Physical Properties, I. Acetals of Saturated Aliphatic Aldehydes", Fitzhugh, A. F. et al.

Primary Examiner—Joseph L. Schofer
Assistant Examiner—J. M. Reddick
Attorney, Agent, or Firm—Michael J. Murphy; William J. Farrington

[57] ABSTRACT

Sheet for safety glazings made of: a) polyvinyl butyral internally plasticized by the presence in the polymer of $C_7$ to $C_{15}$ aliphatic aldehyde groups and b) an external plasticizer in amount sufficient to provide a sheet glass transition temperature of about 25° to 30° C.

5 Claims, No Drawings

POLYVINYL BUTYRAL SHEET

BACKGROUND OF THE INVENTION

This invention relates to polyvinyl butyral sheet for laminated safety glazings and more particularly to plasticizing such sheet for impact dissipation performance.

Polyvinyl butyral (PVB) polymer for use as optically transparent, impact-dissipating sheet in layered laminated safety glazings is well known. Since the glass transition temperature (hereinafter "$T_g$") of unplasticized PVB polymer is too high for it to be a useful elastomer for impact dissipation in these applications, it is also known to reduce such temperature to a useful range by incorporating a plasticizer in such sheet.

Plasticizer admixed in sheet with PVB is not without problems. Depending on volatility, plasticizer can evaporate from the sheet during handling and storage before use. Moreover, in forming the safety glazing elevated temperature on the order of about 150° C. is required to bond the PVB sheet to glass, and significant plasticizer can be lost, particularly along usually unsealed edges of the sheet in the laminate. Perhaps of greater significance are performance problems occurring along the edge of the laminate during its use life which are traceable to the plasticizer. Plasticizer can be displaced from the sheet by atmospheric moisture along unsealed edges in a high humidity environment causing swelling over time. When followed by dry weather, the edge dries and contracts and after many such cycles the unstable edge begins to crack. Moreover, moisture in such high humidity applications can cause a bluish haze in the edge region of the laminate (called edge blush) which is an appearance problem in applications such as windshields where the laminate is exposed to its edge.

It would be desirable to provide soft, rubbery PVB sheet capable of absorbing impact for safety glazing use without exclusively relying on the presence of plasticizer as above described.

SUMMARY OF THE INVENTION

Now improvements have been made in plasticizing PVB polymer which mitigate shortcomings in the prior art.

Accordingly, a principal object of this invention is to provide PVB sheet for laminated safety glazings with performance property improvements associated with the manner in which it is plasticized.

Another object is to provide such sheet having a room temperature (about 25°-30° C.) $T_g$ achieved without exclusively relying on external plasticizer in the sheet.

A further object is to reduce the amount of external plasticizer in PVB sheet for safety glazing use.

Other objects will in part be obvious and will in part appear from the following description and claims.

These and other objects are accomplished by providing sheet comprising:

a) modified polyvinyl butyral polymer internally plasticized by long chain acetal groups, which polymer is represented by the formula:

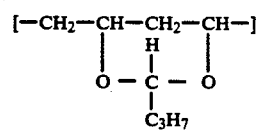

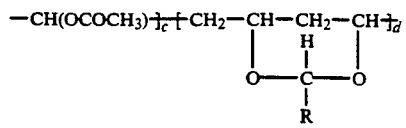

wherein: i) R is linear or branched aliphatic and equals $C_xH_{2x}$ where $x=7$ to 15; ii) a, b, c and d are each weight values with the proviso that $a/(a+b+c+d)$ is in the range from 0.15 to 0.30, $b/(a+b+c+d)$ is in the range from 0.70 to 0.85, $c/(a+b+c+d)$ does not exceed 0.05 and $d/(a+b+c+d)$ is in the range from 0.05 to 0.50; and b) external plasticizer intimately admixed with such polymer in an amount sufficient to provide a glass transition temperature of the sheet of about 25° to 30° C.

DETAILED DESCRIPTION OF THE INVENTION

The polymer component of the sheet of the invention is a modified form of PVB polymer usually used in sheet for laminated safety glazings. More particularly, the modified PVB polymer contains in the polymer backbone 5 to 50%, preferably 10 to 25% by weight long chain acetal groups obtained by chemically reacting long chain aldehydes with a pair of hydroxyl groups on the polyvinyl alcohol (PVOH) precursor used in the synthesis of the basic PVB polymer. Such polymer moiety containing long chain acetal groups is of the formula:

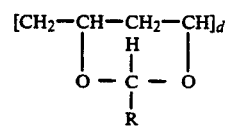

wherein R is linear or branched aliphatic and equals $C_xH_{2x}$ where $x=7$ to 15, preferably 7 to 12 and most preferably 10. The long chain acetal groups are derived from $C_7$ to $C_{15}$ acyclic monoaldehydes—i.e. heptanal to pentadecanal.

The balance of the modified PVB polymer constitutes the structure traditionally used in sheet for glazing applications. Thus, the modified PVB polymer consists of four types of monomeric moieties: the vinyl ($C_7$-$C_{15}$) acetal moiety just identified above and the following three types of monomeric moieties which are conventional in partial PVB polymer in the prior art; vinyl alcohol moiety of the formula [—$CH_2$—$CH(OH)$—], vinyl butyral moiety of the formula:

[—$CH_2$—CH—$CH_2$—CH—]
　　　|　H　|
　　　O—C—O
　　　　|
　　　　$C_3H_7$ and vinyl acetate moiety of the formula:

[$CH_2$—$CH(O$—$CO$—$CH_3)$]

The modified PVB polymer then has the general formula:

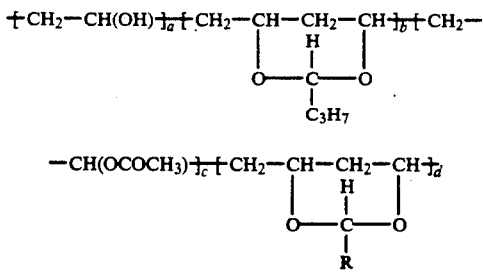

The relative weight fractions of these four types of moieties in the polymer are defined by the ratio of the weight of a particular moiety to the weight of the total moieties—e.g. $a/a+b+c+d$. Thus, for sheet to be used in safety glazings, a, b, c and d in the above general formula satisfy the relationship that $a/(a+b+c+d)$ is in the range from 0.15 to 0.30, $b/(a+b+c+d)$ is in the range from 0.70 to 0.85, $c/(a+b+c+d)$ does not exceed 0.05 and $d/(a+b+c+d)$ is in the range from 0.05 to 0.50, preferably 0.10 to 0.25.

The vinyl ($C_7$ to $C_{15}$) acetal moieties in the modified PVB polymer function as an internal plasticizer to decrease the amount of external plasticizer required to achieve the same room temperature (about 25°-30° C.) $T_g$ of sheet formed therefrom as would be obtained using the greater conventional quantity of external plasticizer. In addition, because of improved compatibility of the modified PVB polymer and the external plasticizer (measured by Exudation Ratio, further defined hereinafter) edge stability of the sheet, and therefor of the safety glazing, is improved.

The modified PVB polymer has a weight average molecular weight greater than 100,000, preferably from about 150,000 to 200,000, as measured by size exclusion chromatography using low angle laser light scattering.

The modified PVB polymer is produced by known aqueous or solvent acetalization by reacting a mixture of butyraldehyde and $C_7$ to $C_{15}$ long chain aldehyde (including a mixture of one or more of the latter) with PVOH in the presence of acid catalyst to produce the polymer, followed by neutralization of the catalyst, separation, stabilization and drying of the polymer.

In forming sheet for safety glazing use, as above noted the amount of external plasticizer is reduced from levels used with conventional unmodified partial PVB. Such amount will vary with $T_g$ of the sheet, compatibility between the modified polymer and the specific external plasticizer chosen, and the level of vinyl alcohol moiety in the polymer. The optimum sheet formulation will always comprise some amount of external plasticizer since a totally internally plasticized polymer is considered too difficult to a) melt process into sheet of relatively uniform thickness and high optical quality and b) autoclave laminate into a clear glazing using conventional autoclave processing conditions. Usually about 20 to 45 and typically about 25 to 40 parts external plasticizer per one hundred parts (phr) modified PVB polymer are adequate. External plasticizers commonly employed are esters of a dibasic acid or a dihydric alcohol. Particularly suitable plasticizers are triethylene glycol di-(2-ethylbutyrate), dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates as disclosed in U.S. Pat. No. 4,144,217. Other suitable plasticizers are known or obvious to those skilled in the art. $C_6$-$C_8$ adipate esters such as hexyl adipate are preferred external plasticizers.

Plasticized modified PVB as sheet for safety glazings at a thickness of about 0.13 to 1.3 mm is formed by initially mixing the modified PVB, plasticizer and optional other conventional performance-enhancing additives (e.g. dyes, pigments, light stabilizers, antioxidants, glass adhesion control agents and the like) then extruding the formulation, usually through a sheeting die, i.e. forcing molten, plasticized PVB through a horizontally long vertically narrow die opening substantially conforming in length and width to that of the sheet being formed. Alternatively such sheet may be formed by casting molten polymer issuing from an extrusion die onto a specially prepared surface of a die roll turning in close proximity to the die exit to impart desired surface characteristics to one side of the molten polymer. When the roll surface has minute peaks and valleys, sheet formed of polymer cast thereon will have a rough surface on the side contacting the roll which generally conforms respectively to such valleys and peaks. A rough surface on the other side can be provided by the design of the die opening through which the extrudate passes. Such a die opening configuration is more particularly shown in FIG. 4 of U.S. Pat. No. 4,281,980. Alternative known techniques of producing a rough surface on one or both sides of an extruding sheet involve the specification and control of one or more of the following: polymer molecular weight distribution, water content and temperature of the melt. Such techniques are disclosed in U.S. Pat. Nos. 2,904,844; 2,909,810; 3,994,654; 4,575,540 and European Pat. No. 0185,863. As is known, this rough surface on the interlayer is only temporary and particularly functions to facilitate deairing during laminating after which it is melted smooth from the elevated temperature and pressure associated with autoclaving.

The properties reported in the Examples were measured in accordance with the following procedures.
1) $T_g$ using a Rheometrics Dynamic Mechanical Spectrometer (unless otherwise indicated).
2) Exudation Ratio - Plasticizer and PVB polymer were blended for 7 min at 150° C. in a Brabender mixer with sigma blades turning at 50 rpm. Using a heated hydraulic press (149° C., 5.5 MPa for 5 min), the resulting plasticized PVB polymer was pressed into 0.76 mm thick sheets. The sheets were cut into 17.5×38 mm samples, dried for 5 days in a desiccator and weighed to get dry weight. These samples were then placed in a wet desiccator (enclosed chamber containing water) for seven days. Each sample was then sandwiched between layers of absorbing cardboard, placed between jaws of a clamp being forced together at a pressure of 1.6 MPa. The clamped samples were placed in a wet desiccator for 10 days. The clamps were removed, the samples washed with warm water to remove residual cardboard, dried five days in a dry desiccator and again weighed. The weight difference in $gm/m^2$ of surface area is plasticizer exudation weight loss. Exudation Ratio is the ratio of the exudation weight loss of external plasticizer to that of din-hexyl adipate (DHA) control plasticizer at 32 phr level which was run in parallel.

Inverted Dart Impact (IDI)—30 mil sheet of modified PVB containing external plasticizer is laminated in conventional manner between two sheets of 90 mil thick float glass at standard laminating conditions of temperature and pressrue to provide 2 in. square laminates. A laminate is fixed in a clamp above a hardened steel dart and then propelled against the dart at a nominal speed of 5000 in. per min. Failure is noted in terms of pounds of force and results are provided as lbs. per mil of sheet thickness.

The invention is further described in the following Examples which are not intended to limit or restrict the invention. Unless otherwise indicated quantities and percentages are expressed in weight. PVOH means polyvinyl alcohol.

EXAMPLE 1

Synthesis of Modified PVB Polymer

Polyvinyl alcohol having a residual polyvinyl acetate content of less than 2% (i.e. "c" in the general formula is <0.02) and a molecular weight of 77,000 was dissolved with agitation in deionized water at 85°–90° C. to form an 8.3% solution. 646.9 g of this PVOH solution was charged to an agitated fluted reactor and its temperature adjusted to 14°–16° C. A mixture of 27.5 g of butyraldehyde and 13.5 g of decanal were added to the PVOH solution along with 5 g of 35% nitric acid catalyst. The reactor contents was allowed to react at 14°–16° C. with agitation until polymer precipitated out of solution after which an additional 6.8 g of 35% nitric acid was added and the temperature gradually increased to 85° C. The reaction was continued at 85° C. for about 4 hours, at the end of which time the reactor contents was washed to pH 4.0, neutralized with 45% potassium hydroxide to pH 10.0, held at this pH for 1.0 hr. at room temperature and then washed with water to pH 7.0. The product was then filtered and dried to less than 2% moisture. Analysis gave the following results:

| Weight Fraction | |
| --- | --- |
| vinyl acetate | 0.020 |
| vinyl alcohol | 0.182 |
| vinyl butyral | 0.598 |
| vinyl decanal | 0.20 |
| $T_g$ | 62.5° C. |

EXAMPLE 2

This measures external plasticizer content required to produce a room temperature $T_g$ in a formulation using the modified PVB polymer of Example 1.

The polymer of Example 1 was dried in hot air to less than 1% $H_2O$ and charged with external dihexyl adipate (DHA) plasticizer to a Brabender intensive mixer maintained at 190° C. and mixed until fluxed and then for four additional minutes. Mixer blades were rotating at about 70 rpm. The blend was removed from the mixer, cooled to room temperature and $T_g$ measured. Results were as follows:

| Weight Fraction | | EXT. PLAST. | $T_g$ |
| --- | --- | --- | --- |
| Vinyl alcohol | Vinyl decanal | (phr) | (°C.) |
| 0.182(control) | 0 | 0 | 77.5 |
| 0.182(control) | 0 | 32 | 30 |
| 0.182 | 0.20 | 0 | 62.5 |
| 0.182 | 0.20 | 25 | 29.5 |

From the above, with the modified PVB polymer of Example 1 about 22% less external plasticizer produces about the same 29.5° to 30° C. $T_g$ as the control without $C_{10}$ acetal groups.

The procedure of Example 1 was repeated to produce the following modified PVB polymer:

| Weight Fraction | |
| --- | --- |
| vinyl acetate | 0.02 |
| vinyl alcohol | 0.15 |
| vinyl butyral | 0.43 |
| vinyl decanal | 0.40 |
| $T_g$ | 52.3° C. |

When plasticized with DHA according to the above procedure, the following results were obtained:

| Ext. Plast. (phr) | $T_g$(°C.) |
| --- | --- |
| 25 | 20.3 |
| 32 | 15.3 |

From the above, increasing the amount of long chain acetal groups in the polymer decreases Tg.

EXAMPLE 3

The synthesis procedure of Example 1 was repeated except using 12.1 g of octanal instead of decanal with 25.9 g of butyraldehyde. Polymer analysis was:

| Weight Fraction: | |
| --- | --- |
| vinyl acetate | 0.02 |
| vinyl alcohol | 0.158 |
| vinyl butyral | 0.622 |
| vinyl octanal | 0.20 |
| $T_g$ | 59.4° C. (by differential scanning calorimeter (DSC) |

Plasticized polymer analysis was:

| Weight Fraction | | Ext. | Tg(°C.) |
| --- | --- | --- | --- |
| Vinyl alcohol | Vinyl octanal | Plast | (DSC) |
| 0.158 | 0 | 28.7[1] | 30 |
| 0.158 | 0.20 | 22[1] | 30 |
| 0.158 | 0.20 | 23[2] | 30 |

[1]dihexyl adipate
[2]n-hexyl, cyclohexyl adipate

The above shows that modified PVB polymer containing octanal groups requires about 23% less external plasticizer to produce the same 30° C. Tg as the control without $C_8$ acetal groups.

EXAMPLE 4

This Example examines the compatibility of modified PVB polymer and external plasticizer as determined by exudation ratio (ER) of the plasticized modified PVB polymer of Example 2.

| Polymer | $T_g$ (°C.) | PHR DHA | ER |
| --- | --- | --- | --- |
| modified | 29.5 | 25 | 0.2 |
| unmodified (no vinyl decanal) | 30 | 32 | 1.0 |

The above illustrates the significant reduction (80%) in plasticizer loss and consequent projected major improvement in edge stability performance of sheet formed from modified PVB polymer internally plasticized with vinyl decanal plasticized according to the invention, in comparison with the unmodified control requiring greater external plasticizer to achieve an essentially equivalent $T_g$. Comparable results are predicted using PVB modified with other $C_7$ to $C_{15}$ acetal moieties.

EXAMPLES 5-9

These Examples measure impact performance and compatibility (ER) of sheet made of PVB containing two levels of vinyl decanal ($C_{10}$) groups and n-hexyl, cyclohexyl adipate external plasticizer, as compared with an unmodified control. Results were as follows.

| Example | % $C_{10}$ | % PVOH | PHR Ext. Plast. | Tg °C. | ER | IDI IMPACT (lbs/mil) | | |
|---|---|---|---|---|---|---|---|---|
| | | | | | | −18° C. | 23° C. | 49° C. |
| 5(control) | 0 | 18.2 | 32[1] | 30 | 1.0 | 3.8 | 4.1 | 1.8 |
| 6 | 10 | 18.1 | 31.4 | 28.5 | 0.2 | 3.4 | 3.7 | 1.7 |
| 7 | 10 | 20.6 | 35.8 | 28.5 | 0.7 | 3.8 | 3.8 | 2.1 |
| 8 | 20 | 18.7 | 29.8 | 28.5 | 0.3 | 2.5 | 3.1 | 2.0 |
| 9 | 20 | 20.9 | 34.0 | 28.5 | 0.7 | 4.3 | 3.4 | 2.1 |

[1]Plasticized with DHA

From the above, as compared with control Example 5, the exudation ratios of the vinyl decanal modified PVB's are superior and the IDI impact performances thereof are comparable to those of the control.

The preceding description is for illustration only and is not to be taken in a limited sense. Various modifications and alterations will be readily suggested to persons skilled in the art. It is intended, therefore, that the foregoing be considered exemplary only and that the scope of the invention be ascertained from the scope of the following claims.

We claim:
1. Sheet comprising:
   a) modified polyvinyl butyral polymer internally plasticized by long chain acetal groups, which polymer is represented by the formula:

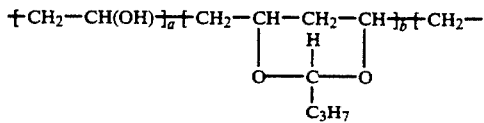

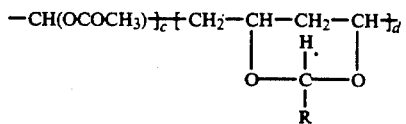

wherein: i) R is linear or branched aliphatic and equals $C_xH_{2x}$ where $x=7$ to 15; ii) a, b, c and d are each weight values with the proviso that $a/(a+b+c+d)$ is in the range from 0.15 to 0.30, $b/(a+b+c+d)$ is in the range from 0.70 to 0.85, $c/(a+b+c+d)$ does not exceed 0.05 and $d/(a+b+c+d)$ is in the range from 0.05 to 0.50; and b) external plasticizer intimately admixed with such polymer in an amount sufficient to provide a glass transition temperature of the sheet of about 25° to 30° C.

2. The sheet of claim 1 wherein $d/(a+b+c+d)$ is in the range from 0.10 to 0.25.

3. The sheet of claim 1 or 2 wherein $x=7$ to 12.

4. The sheet of claim 3 wherein the external plasticizer comprises $C_6$-$C_8$ ester.

5. The sheet of claim 4 wherein the amount of external plasticizer is about 25 to 40 parts by weight per 100 parts by weight polymer.

* * * * *